United States Patent [19]
Berger

[11] Patent Number: 6,035,085
[45] Date of Patent: Mar. 7, 2000

[54] DIGITAL AND ANALOG COMPATIBLE TRIAXIAL CABLE SYSTEM

[75] Inventor: Andres Miguel Berger, Oakland, N.J.

[73] Assignees: Sony Corporation, Tokyo, Japan; Sony Electronics, Inc., Park Ridge, N.J.

[21] Appl. No.: 09/306,065

[22] Filed: May 6, 1999

Related U.S. Application Data

[62] Division of application No. 08/933,730, Sep. 23, 1997.

[51] Int. Cl.[7] .................................................. H01B 11/22
[52] U.S. Cl. ........................... 385/101; 348/552; 386/112
[58] Field of Search ..................................... 385/100, 101, 385/14; 348/552; 386/112, 109, 46

[56] References Cited

U.S. PATENT DOCUMENTS 5,625,410    4/1997    Washino et al. ........................ 348/154

OTHER PUBLICATIONS

Nikoh et al., "The Full Digital Video Camera System and Simulation Of Its Essential Parameters", IEEE WAM 1.2, pp. 4–5, 1988.

Morimura et al., "A Digital Video Camera System", IEEE Transactions on Consumer Electronics, vol. 36, No. 4, pp. 886–876, Nov. 1990.

*Primary Examiner*—John D. Lee
*Assistant Examiner*—Victoria D. Hao
*Attorney, Agent, or Firm*—Jay H. Maioli

[57] ABSTRACT

A triaxial cable for connecting a digital video camera with other video equipment is provided with optical fibers embedded in an insulating layer between two electrical conductors of the cable. The cable and associated connectors are electrically compatible with cable systems using king-stype conductors. A camera adapter and camera control unit are provided with means for communicating video signals both as digital signals along the optical fibers and as analog signals along the electrical conductors.

6 Claims, 4 Drawing Sheets

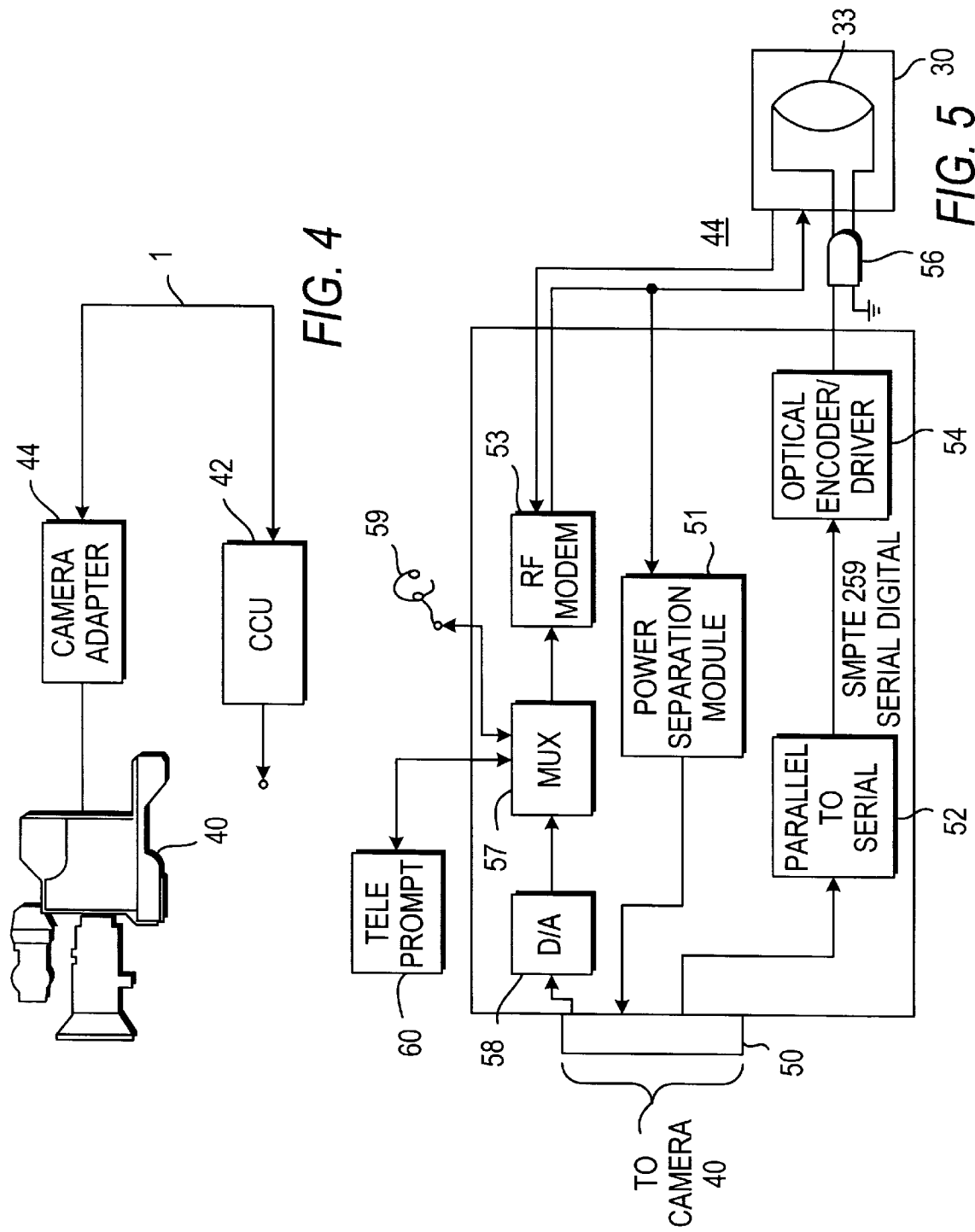

DIGITAL AND ANALOG COMPATIBLE TRIAXIAL CABLE SYSTEM

This is a division of prior application Ser. No. 08/933,730 filed Sept. 23, 1997 still pending.

BACKGROUND OF THE INVENTION

1. Field of the Invention

This invention relates generally to the field of cable systems for video cameras. More particularly, this invention relates to a cable system that is compatible with both analog signals transmitted via triaxial electrical conductors and with digital video signals transmitted via optical fibers.

2. Description of Related Art

The introduction of digital techniques for capturing and editing video images has lead to improvements in the quality of images available to consumers and to greater flexibility for editors and producers.

Digital video cameras that capture images using arrays of pixels and compile those pixels into a video signal represent the state of the art in video camera technology. These cameras are rugged, compact, and deliver high-quality video images. The vast majority of video cameras used by consumers and professionals incorporate a digital image capturing mechanism.

Digital editing systems are also well known and represent the state of the art in professional video production systems. Editing video signals in the digital domain allows the use of sophisticated computerized techniques. Digital images may be seamlessly enhanced and combined to produce programs that would be impossible to produce using analog systems.

Optical fibers may be used to transmit a digital video signal from a digital camera to an editing system. The digital image signal from the camera is converted to an encoded train of light pulses by a camera adapter using a loss-less conversion process. These pulses are directed along an optical fiber to a camera control unit. The camera control unit converts the encoded pulse train into an exact replica of the original digital signal and provides this signal to editing, recording and broadcasting equipment.

An obstacle to the use of optical fiber cables is that much of the equipment currently used by professional broadcasters is compatible with triaxial cabling using a standard "kings" type connector. In order to accommodate this equipment most broadcast venues, for example sports stadiums, are wired with triaxial cabling and standard connectors. Standardized cabling simplifies the task of setting up cameras and editing facilities at such venues, since broadcasters simply need to connect cameras and editing systems via the installed triaxial cable. It is expected that for the foreseeable future venue owners will continue to install triaxial cable.

Triaxial electrical cable has a narrower bandwidth than optical fiber. As a result digital video signals cannot reliably be transmitted along triaxial cable using loss-less compression techniques. Rather than compress the digital signal, most systems convert the digital signal to an analog signal and then transmit the analog signal along the triaxial cable. The received signal is then reconverted to a digital signal.

The conversion of a digital signal to an analog signal and then from that analog signal back to a digital signal necessarily results in a loss of image quality. Digital video images captured by a camera are a collection of quantized light intensity values for each pixel of the video frame. Conversion of this digital signal to an analog signal requires that voltage levels between the pixel quantizations, as well as the signal values between pixels, be interpolated to produce a continuous analog signal. The analog signal is transmitted along a cable and is received by, for example, a digital editing system.

The analog signal is then sampled and quantized to convert it back to the digital domain. The sample points of the converted signal will not necessarily coincide with the positions of the original pixels captured by the camera and the quantization of the interpolated signal will therefore be an approximation of the original digital signal. This results in a loss of image fidelity between the captured image and the reconverted digital signal.

It is therefore advantageous for the captured digital image to be transmitted from the camera to the editing system completely in the digital domain along cables that are compatible with existing video equipment.

OBJECTS AND SUMMARY OF THE INVENTION

In view of the above-mentioned shortcomings of known video cable systems, it is an object of the present invention to provide a cable for communication of video signals transmitted along both electrical conductors and optical fibers.

It is another object of the present invention to provide a cable for transmitting digital video signals that is compatible with existing broadcast video equipment.

It is yet another object of the present invention to provide a camera adapter and camera control unit that transmit video signals both as analog signals along a standard triaxial cable and as optical digital signals along a triaxial cable with embedded optical fibers.

According to an aspect of the present invention there is provided a cable for connecting video cameras with video production equipment wherein inner and outer conductive layers are arranged coaxially and separated by an insulating layer. These conductors are surrounded by a conductive shielding layer arranged coaxially around them and separated from the conductors by a second insulating layer. Embedded in the second insulating layer are one or more optical fibers extending the length of the cable.

According to another aspect of the invention there is provided a connector at each end of a cable according to the first aspect, this connector being configured to fit into receiving connectors on a video camera adapter and a camera control unit for communication therebetween. The connectors and the receiving connectors are arranged so that the conductors and the shielding layer in the cable are connected to appropriate electrodes within the camera adapter and camera control unit to communicate analog video signals along the cable. Also, optical signals for transmitting a digital signal are coupled into the optical fibers embedded in the second insulating layer by the camera adapter. These optical signals are coupled to an optical receiver and converted to a standard digital video format by the camera control unit.

BRIEF DESCRIPTION OF THE DRAWINGS

FIG. 4 shows the camera and camera control unit connected using the cable of FIG. 1.

FIG. 5 is a block diagram showing the camera adapter according to the embodiment of the present invention.

DETAILED DESCRIPTION OF PREFERRED EMBODIMENTS

Figure 1:
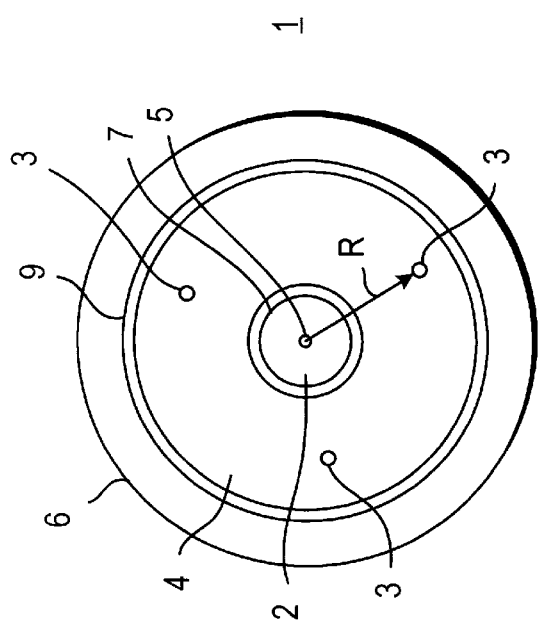
FIG. 1 is a cross section of a cable according to an embodiment of the present invention.

FIG. 1 shows a cross section of a cable 1 according to an embodiment of the present invention. Conductors 5,7,9 are arranged coaxially along the length of the cable. In typical applications the inner conductors 5,7 carry signals and the outer conductor 9 serves to shield the inner conductors 5,7 from electromagnetic interference. The conductors 5,7,9 are separated from one another by insulating layers 2 and 4. The outer surface of the cable 1 is protected by a jacket layer 6.

Embedded in the second insulating layer 4 are optical fibers 3. The fibers 3 are axially arranged along a locus a distance R from the axis of the cable 1.

The characteristics of the conductors 5,7,9 and the insulating layers 2,4 are selected so the cable is electrically compatible with the transmission of analog video signals.

The optical fibers 3 are designed to transmit optical signals encoding video images and may be so-called communications-grade optical fibers.

It should be noted that either or both insulating layers 2, 4 could be used to embed the optical fibers 3. Also, the number of conductors 5, 7, 9 is chosen to illustrate the present invention but a larger or smaller number of conductors could be used according to the present invention.

Figure 2:
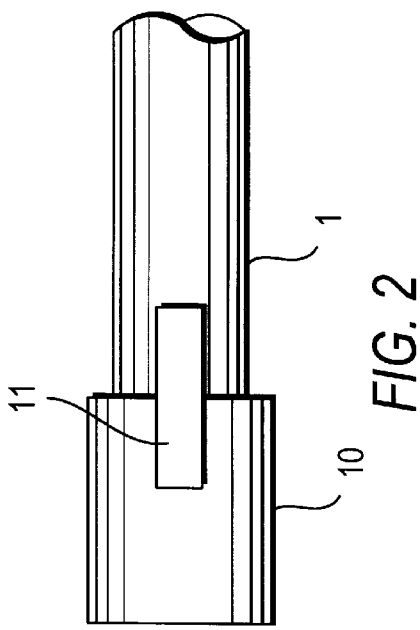
FIG. 2 shows a connector for use with the cable of the embodiment of FIG. 1.

FIG. 2 shows a connector 10 attached to an end of the cable 1. The configuration of the connector 10 may be the same as a standard "kings" type connector to provide backward compatibility with existing broadcast video equipment.

Figure 3:
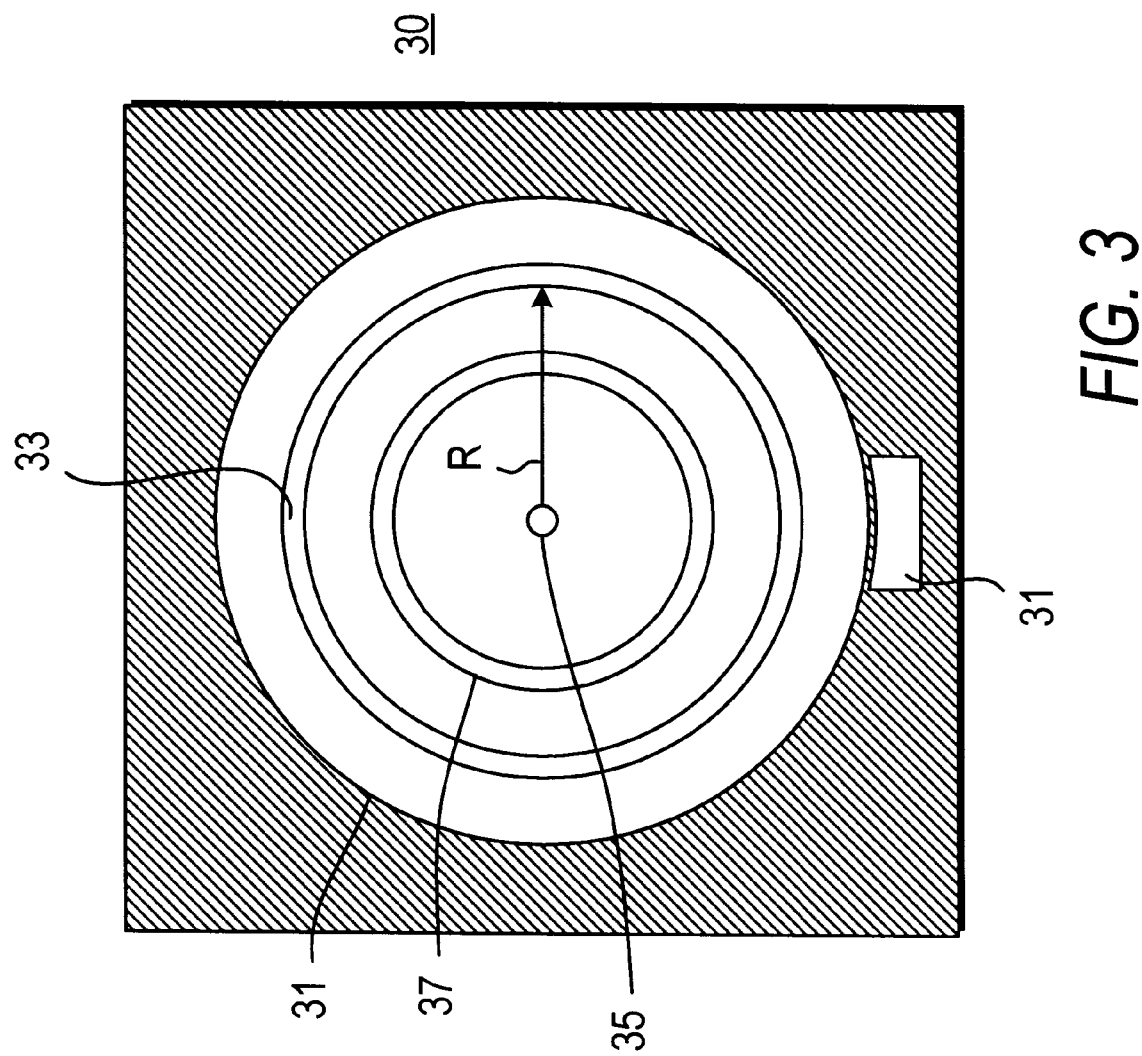
FIG. 3 shows a receiving connector for connecting the cable of FIG. 1 to a camera adapter and camera control unit according to the embodiment of the present invention.

FIG. 3 shows an end view of a receiving connector 30 for connecting the cable 1 and connector 10 with a camera adapter 44 and camera control unit (CCU)42, shown in FIG. 4. Electrical connectors 35 and 37 are arranged to contact the electrical conductors 5 and 7, respectively, in the cable 1 when the connector 10 is inserted into the receiving connector 30. Likewise, the shielding connector 39 is arranged to contact the shielding layer 9 of the cable 1. An optical coupling ring 33, with a mean radius R and a width slightly larger than the diameter of the optical fibers 3, is arranged to contact the ends of the optical fibers 3 when the connector 10 is inserted into the receiving connector 30.

Because the fibers 3 are equidistant from the axis of the cable 1 the ring 33 will contact each of the fibers 3 irrespective of the rotational position of the cable 1 with respect to the connector 10. A mechanical connector 31 attaches the cable connector 10 to the receiving connector 30 by engaging with a catchment 11 on the cable connector 10.

The receiving connector 30 is designed to accommodate connectors 10 according to the present invention as well as standard kings connectors. When a standard connector is used the connector functions as described above, however, no optical fibers are available to receive a digital video signal.

FIG. 4 shows the cable 1 connecting the camera 40 and camera adapter 44 with the CCU 42. The camera adapter 44 serves to mediate signals conducted along the cable 1 between the camera 40 and the camera control unit 42. The CCU 42 communicates signals to and from other video processing equipment, such as editing systems or video recorders (not shown).

FIG. 5 is a block diagram showing the functional components of the camera adapter 44. A multipin connector 50 provides a digital interface to a camera, such as shown at 40 in FIG. 4. Digital video signals from the camera 40 are sent to a parallel-to-serial converter 52 that converts a parallel image signal to a standard digital interface format. This format may be, for example, an SMPTE 259 serial digital signal.

The signal from the parallel-to-serial converter 52 is sent to an optical encoder/driver 54 that converts the serial digital signal to a waveform for driving a light emitting diode (LED) 56. The LED 56 is optically connected to the optical coupling ring 33 within the receiving connector 30. When a connector 10 on a cable 1 is inserted into the receiving connector 30, the ring 33 couples the light signal from the LED 56 into the optical fibers 3.

Electrical connections are made from the contacts 35 and 37, shown in FIG. 3, within the receiving connector 30 to a power separation module 51. The power separation module 51 extracts current transmitted along the cable 1 and provides this current to the camera 40 via the connector 50 and to the other components of the camera adapter 44.

Digital signals from the camera 40 are also sent to a digital to analog (D/A) converter 58 via the connector 50. The D/A converter 58 converts the digital video signal from the camera 40 into an analog signal.

The analog video signal from the D/A converter 58 is sent to a multiplexer/demultiplexer (Mux) 57. The mux 57 also receives intercom signals from a headset and microphone 59. These signals are multiplexed and sent to an radio frequency modem 53. The modem 53 modulates the multiplexed signals with a radio frequency carrier and sends the signal to the cable 1 via the connectors 35, 37 in the receiving connector 30 to communicate with the CCU 42.

The modem 53 also receives signals from the CCU 42. These signals include teleprompter signals and intercom signals. Electrical signals received from the CCU 42 via the cable 1 are demodulated by the modem 53 and separated by the Mux 57. Teleprompter signals are sent to the teleprompter 60. Intercom signals are sent to the headset 59.

Because video signals are transmitted as analog signals through the connector 30 that is equivalent to a standard kings connector, the camera adapter 44 is backwards compatible with conventional triaxial cable systems.

Figure 6:
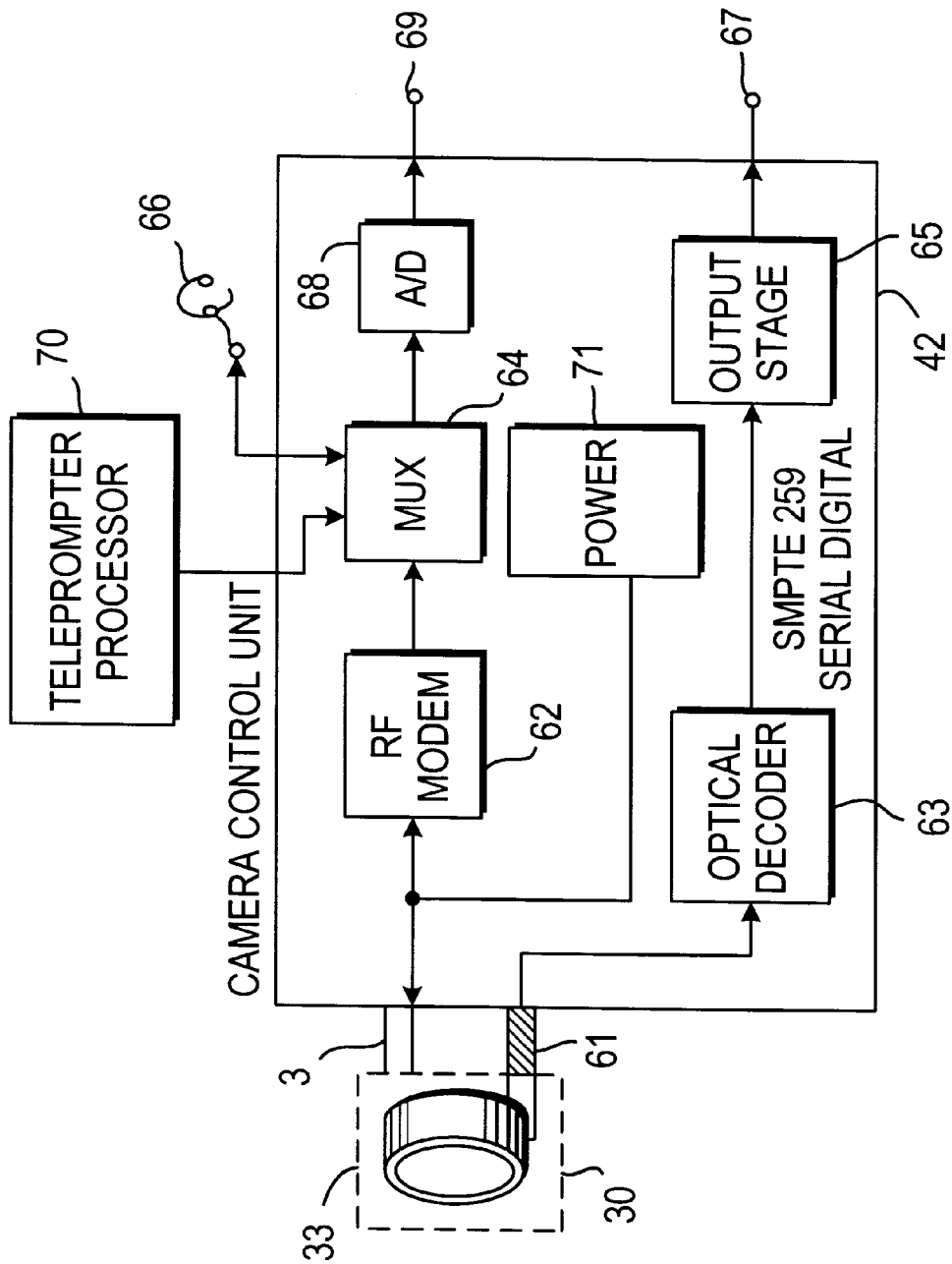
FIG. 6 is a block diagram of a camera control unit according to the embodiment of the present invention.

FIG. 6 shows a block diagram of a CCU 42 according to the present invention. The cable 1 with a connector 10 is connected to a receiving connector 30. Electrodes 35, 37, 39 in the connector 30 contact the conductors 5, 7, 9, respectively, in the cable 1. An optical coupling ring 33 contacts the optical fibers 3 in the cable 1. A photosensor 61 is optically coupled to the ring 33 and generates an electrical signal in response to light pulses conducted through the optical fibers 3 from the camera adapter 44 shown in FIG. 5. The signal from the photosensor 61 is decoded into a standard digital signal, for example, an SMPTE 259 serial digital signal, by the optical decoder 63. The signal is then processed by the output stage 65 and appears at an output terminal 67 as a digital video signal.

Electrical signals received by the contacts 35 and 37 of the connector 30 are demodulated by a radio frequency modem 62 into a multiplexed analog signal. A multiplexer/demultiplexer (Mux) 64 demultiplexes the signal to separate the intercom signals from the headset and microphone 59 and the analog video signal generated by the D/A converter 58 in the camera adapter 44. Intercom signals are also sent to a headset 66. The analog video signal is processed by an analog to digital converter (A/D) 68 to convert the analog video signal into a standard digital signal, for example, an SMPTE 259 signal. The digital video signal is then output at terminal 69.

The Mux 64 receives teleprompter signals from a teleprompter processor 70. Intercom signals from the headset and microphone 66 are also received by the Mux 64. The Mux 64 multiplexes these signals and the RF modem 62 modulates the multiplexed signal with an RF carrier to form a control signal. The RF modulated signal is then sent along the conductors 5, 7 in the cable 1 to the camera adapter 44.

A power supply 71 provides current to the conductors 5, 7. This current is extracted by the power module 51 in the camera adapter 44 and is used to power the camera 40 and the camera adapter 44.

The camera adapter 44 and CCU 42 are compatible with both a standard triaxial cable and with a cable, such as shown at 1 in FIG. 1, 1 including embedded optical fibers 3. Where a standard cable is used, the reconverted digital signal is available at terminal 69. Where a cable 1 according to the present invention is used, the higher quality digital signal is available at terminal 67.

The embodiment described above is an illustration of the present invention. Those skilled in the art can vary the above embodiment while remaining within the spirit and scope of the present invention that is defined by the appended claims.

What is claimed is:

1. A camera adapter for connecting a digital video camera to a camera control unit via a cable incorporating electrical conductors and optical fibers, said camera adapter comprising:

electrical connectors connected to said cable for conducting electrical signals to said electrical conductors within said cable, said electrical conductors communicating electrical signals to and from said camera control unit;

an optical transmitter coupled to said optical fibers embedded in said cable;

an optical encoder connected to said camera and said optical transmitter for converting a digital video signal from said camera to a digital transmission signal for transmission along said optical fibers;

a digital to analog converter connected to said camera for converting said digital video signal to an analog signal; and an analog transmitter connected to said electrical conductors for communicating said analog signal along said electrical conductors.

2. The camera adapter according to claim 1 wherein said optical fibers are arranged along a locus at a predetermined radius from the axis of said cable and wherein said optical transmitter includes an optical coupling ring with a radius substantially equal to said predetermined radius disposed to couple with each of said optical fibers.

3. The camera adapter according to claim 1 wherein said analog transmitter includes a multiplexer/demultiplexer for multiplexing communication signals with said analog video signal and for demultiplexing communication signals received along said cable from said camera control unit.

4. The camera adapter according to claim 3 further comprising an intercom headset connected to said multiplexer/demultiplexer for generating and receiving intercom signals from said camera control unit.

5. The camera adapter according to claim 3 further comprising a teleprompter connected to said multiplexer/demultiplexer for receiving teleprompter signals from said camera control unit.

6. The camera adapter according to claim 1 further comprising a power separation module connected to said connectors for extracting electrical power carried along said conductors and for supplying said electrical power to said camera adapter and said camera.

* * * * *